US012208437B2

(12) United States Patent
Giaccone

(10) Patent No.: US 12,208,437 B2
(45) Date of Patent: Jan. 28, 2025

(54) PRESS BRAKE AND METHOD FOR OPERATING THEREFOR

(71) Applicant: Clever Group B.V., Noordwolde (NL)

(72) Inventor: Morris Giaccone, Noordwolde (NL)

(73) Assignee: Clever Group B.V., Noordwolde (NL)

( * ) Notice: Subject to any disclaimer, the term of this patent is extended or adjusted under 35 U.S.C. 154(b) by 0 days.

(21) Appl. No.: 17/921,584

(22) PCT Filed: Oct. 23, 2020

(86) PCT No.: PCT/NL2020/050657
§ 371 (c)(1),
(2) Date: Oct. 26, 2022

(87) PCT Pub. No.: WO2021/080429
PCT Pub. Date: Apr. 29, 2021

(65) Prior Publication Data

US 2023/0347399 A1 Nov. 2, 2023

(30) Foreign Application Priority Data

Oct. 25, 2019 (NL) ..................................... 2024104

(51) Int. Cl.
*B21D 5/02* (2006.01)
*B30B 1/02* (2006.01)
*B30B 1/30* (2006.01)

(52) U.S. Cl.
CPC .................. *B21D 5/02* (2013.01); *B30B 1/02* (2013.01); *B30B 1/30* (2013.01)

(58) Field of Classification Search
CPC ................ B30B 1/02; B30B 1/30; B21D 5/02
See application file for complete search history.

(56) References Cited

U.S. PATENT DOCUMENTS 2,461,034 A 2/1949 Castle
3,719,445 A * 3/1973 Sindelar .............. B30B 15/0088 425/150
4,030,364 A * 6/1977 Atwood .................... F16P 3/04 74/612
5,012,729 A 5/1991 Slot
(Continued)

FOREIGN PATENT DOCUMENTS

CN 110280635 A 9/2019
EP 0384529 A1 8/1990
(Continued)

*Primary Examiner* — Teresa M Ekiert
(74) *Attorney, Agent, or Firm* — The Webb Law Firm

(57) ABSTRACT

The present invention relates to a press brake and a method for operating a press brake. The press brake according to the present invention includes a press brake frame; a lever that is moveably attached to the frame and that is moveable between a press position and a release position; a motor that is operatively attached to the frame and the lever, which the motor is configured to move the lever between the press position and the release position; and a pressing element including a top pressing part and a bottom pressing part. The bottom pressing part is operatively connected to the frame. The top pressing part is operatively connected to the lever. The top pressing part and the bottom pressing part are configured to mate when the lever is in the press position.

19 Claims, 10 Drawing Sheets

(56) References Cited

U.S. PATENT DOCUMENTS

| | | | | |
|---|---|---|---|---|
| 6,823,708 | B1 * | 11/2004 | Okubo | B21D 43/11<br>700/165 |
| 2014/0165689 | A1 * | 6/2014 | Patuzzi | B21D 5/02<br>72/389.1 |
| 2017/0165734 | A1 * | 6/2017 | Denkmeier | B21D 37/14 |

FOREIGN PATENT DOCUMENTS

| | | | |
|---|---|---|---|
| KR | 101738463 | B1 | 5/2017 |
| SE | 448686 | B | 3/1987 |

* cited by examiner

PRESS BRAKE AND METHOD FOR OPERATING THEREFOR

CROSS-REFERENCE TO RELATED APPLICATIONS

This application is the United States national phase of International Application No. PCT/NL2020/050657 filed Oct. 23, 2020, and claims priority to The Netherlands Patent Application No. 2024104 filed Oct. 25, 2019, the disclosures of which are hereby incorporated by reference in their entirety.

BACKGROUND OF THE INVENTION

Field of the Invention

The present invention relates to a press brake that is also referred to as a bending machine. The invention further relates to a method for operating such a press brake.

Description of Related Art

Press brakes are known from practice and have a frame that is provided with a pressing element. The pressing element comprises a bottom pressing part, also known as a die, and a top pressing part, also known as a punch. In the known press brakes, the bottom pressing part is fixed, while, during a press cycle, the top pressing part moves down towards the bottom pressing element to exert a force on a product to be formed. When a plate, for example a steel plate, is placed between the top pressing part and the bottom pressing part, the press brake bends the plate to create an angled profile in the plate.

In practice, various different operating options are available for driving the top pressing element. One conventional option comprises a pulley assembly having a number pulleys that is positioned in a line on a front side of the frame near the bottom element, and a number of pulleys that are fixed on the top pressing element, such that they are positioned above the frame-connected pulleys. The pulleys are connected with a belt and driven by an electric motor. By pulling the belt the motor brings the pulleys fixed on the top pressing element to the pulleys fixed on the frame, thereby moving the top pressing element down.

A disadvantage of such a pulley-driven press brake is that the press brake does not have sufficient pressing power at the (end) sides of the top pressing element, because the force is highest near the center of the pulley assembly. This may lead to uneven or distorted bending of the plate material.

Another conventional option for driving a press brake is a motor that drives a spindle that is attached to the top pressing element. In practice, a gearbox is often placed between the motor and the spindle. By driving the motor, the top pressing element is moved down- and/or upwardly to respectively press and unlock the press brake.

A disadvantage of such a spindle configuration is that the spindles are expensive. Furthermore, a press brake with a spindle configuration produces a lot of noise, which can be a hindrance to the people operating the press brake. Another disadvantage is that the spindles need to be oiled, which can leak during operation resulting in high maintenance time and costs.

SUMMARY OF THE INVENTION

It is an object of the present invention to obviate or at least reduce at least one of the abovementioned problems. More particularly, it is an object of the present invention to provide a low maintenance, high performance press brake that has a relatively low noise production.

This object is achieved by a press brake according to the invention, the press brake comprising:

- a press brake frame;
- a lever that is moveably attached to the frame and that is moveable between a press position and a release position;
- a motor that is operatively attached to the frame and the lever, wherein the motor is configured to move the lever between the press position and the release position; and
- a pressing element comprising a top pressing part and a bottom pressing part, wherein one of the bottom pressing part and the top pressing part is operatively connected to the frame, wherein the other of the top pressing part and the bottom pressing part is operatively connected to the lever, and wherein the top pressing part and the bottom pressing part are configured to mate when the lever is in the press position.

In the press brake according to the invention a lever is moveably attached to the frame. Preferably, the lever is hingedly connected to the frame. By moving the lever its position switches between the release position, wherein a plate can be provided to and/or removed from the opening between the top and bottom pressing parts of the press brake for example, and the press position, wherein a plate can be pressed or bended for example.

An advantage of the press brake, that is also referred to as a bending machine, is that due to the fact that the driving of the top pressing part is done by the lever, the press brake produces less noise when going from the release position to the press position and back compared to the spindle configuration from the prior art. Another advantage of the press brake according to the invention is that the top pressing part is able to move faster from the release position to the press position and back. This speeds up the pressing process, thereby reducing the costs for pressing plates.

Another advantage of using a lever is that the power that needs to be supplied by the motor for achieving a certain pressing power from the top pressing part is reduced. Experiments have shown that a low-power motor compared to the prior art can be used to still achieve a sufficient pressing power. This achieves a more energy efficient system, reducing costs of operating the press brake. Furthermore, a low-power motor will also produce less noise, thus providing that people operating the press brake will be less hindered by noise pollution.

The frame of the press preferably comprises a longitudinal axis. The longitudinal axis preferably extends substantially parallel with a contact line of the top pressing part and the bottom pressing part. The top pressing part and the bottom pressing part are preferably substantially plate shaped, wherein one of both may have a sharp edge and the other may have an opening configured to receive the sharp edge to allow the press brake to bend the plate material. A longitudinal axis of the top pressing part and bottom pressing part are substantially aligned with the longitudinal axis. The frame preferably comprises two longitudinal sides or ends that extend substantially parallel to each other and perpendicular to the longitudinal axis.

When the lever is in the release position, the top pressing part is positioned at a first distance above the bottom pressing part. When the lever is in the press position, the top pressing part is positioned substantially against the bottom pressing part. It may be apparent for the skilled person that in a press position of the lever the top pressing part could also be positioned at a second distance above the bottom pressing part, wherein the second distance is much smaller than the first distance. The top pressing part is operatively connected to the lever such that, when the lever is moved from the release position to the press position, the top pressing part preferably makes a substantially linear downward movement towards the bottom pressing part, such that plate material, for example a steel plate, that is placed on the bottom pressing part is bend into an angle under pressure of the pressing element.

The lever preferably is positioned at, on or near a longitudinal side of the frame and preferably extends in a plane perpendicular to the longitudinal axis and substantially parallel to the side of the frame. The motor is preferably operatively connected to a gearbox. The motor is operatively connected to the lever such that by operation of the motor the lever can be moved from the release position to the press position and vice versa. In case of a gearbox being present, the gear box is positioned between the motor and the lever. The motor and/or the gearbox (if present) is preferably positioned in the plane perpendicular to the longitudinal axis such that a force provided at a motor end of the lever can be adequately transferred to a press end of the lever to the top pressing part. It is noted however that the motor can also be positioned in a plane that extends parallel to, or even includes, the longitudinal axis.

The top pressing part and bottom pressing part are configured to cooperate, or substantially mate, when the lever is in the press position. For example, the top pressing part could be a male part while the bottom pressing part could be a female part. The male and female part could for example be substantially V-shaped, such that when the top pressing part moves closer to the bottom pressing part a steel plate to be pressed forms according to the substantial V-shape and acquires a bend or angle. The shape may however also have another form, such as a substantially straight angle. For the skilled person it is apparent that, although not preferred, it is also possible that the top pressing part has a female part and the bottom pressing part has a male part. The top pressing part and the bottom pressing part may have complementary shapes.

In an embodiment according to the invention the lever is pivotably connected to the frame.

By being pivotably connected to the frame the lever is pivotable around an axis. This axis preferably is parallel to or coincident with the longitudinal axis of the frame. The lever could for example be pivotably connected to the frame by having a pivot connection to the frame, which may for example be formed by the lever being positioned on an axle or shaft, yet may also be formed by a rotatable (gear) transmission or any other type of suitable connection.

An advantage of being pivotably connected is that a force provided by the motor on the motor end of the lever can be easily transferred to the press end of the lever. Furthermore, the direction of the force applied by the motor can be redirected such that it effectively moves the top pressing part downwards in a substantially linear direction when the lever moves from the release position to the press position. This ascertains that the top pressing part is (during pressing) in line with the bottom pressing part.

In an embodiment linear movement of pressing end of the lever is achieved by hingedly providing a connecting element between the pressing end of the lever and the top pressing part.

Alternatively or additionally, by being pivotably connected the lever can be designed such that it provides more or less force to the top pressing part, according to the desires of the operators operating the pressing system. It is for example possible that an arm of the lever from the motor end to the pivot connection is larger than an arm of the lever from the lever end to the pivot connection, thereby providing a larger force to the top pressing part. In other words, the positioning of the lever and/or the relative lengths of the lever parts with regard to the connection point may (additionally) be used to determine the force exerted on the plate material to be pressed.

In an embodiment the arm of the lever from the motor end to the pivot connection is smaller than the arm of the lever from the lever end to the pivot connection, thereby providing a smaller force to the top pressing part, but a higher speed. A higher speed can increase the amount of plates to be pressed per time unit.

In an alternative embodiment according to the invention, the arms of the lever are adjustable, thereby creating a press brake which can give the desired ratio between the force and speed provided by the lever by a simple adjustment of the length of one or both arms of the lever. This provides the operators of the press brake with a more versatile press brake.

In a further embodiment according to the invention the motor comprises an electric motor.

The advantage of an electric motor is that the press brake produces less noise compared to using hydraulic motor. Furthermore, an electric motor is less susceptible to wear, thus reducing maintenance costs of the press brake.

In a further embodiment according to the invention the press brake further comprises a pulley assembly that is operatively connected to and positioned between the motor and the lever.

The pulley assembly comprises at least one pulley. The pulley assembly further comprises a connecting element that preferably is an elongated flexible element, such as a belt, a string, a chain or any other suitable means. The pulley assembly could comprise multiple pulleys. It may be that at least one of the pulleys is attached to the frame. The pulley assembly can in such case be operatively connected to the motor and lever by connecting a motor end of the connecting element to the motor and a second end of the connecting element to the lever, while the connecting element is placed around a pulley attached to the frame. It may also be that at least one pulley is attached to the lever. The pulley assembly can then be operatively connected to the motor and lever by connecting a motor end of the connecting element to the motor and a second end of the connecting element to the frame, while the connecting element is placed around a pulley attached to the frame and a pulley attached to the lever. Herein a force applied on the connecting element by the motor moves the pulley attached to the lever to the pulley attached to the frame, thereby pivoting the lever from a release position to a press position. It may further be, with multiple pulleys, that some of the pulleys are connected to the frame and others are connected to the lever.

An advantage of having a pulley assembly operatively connected to and positioned between the motor and the lever is that a force supplied by the motor is amplified at the lever. For example, the force supplied by the motor can be 20 kN, while the resulting power at the lever, through the enhancement of the pulley assembly, is then 100 kN. In this way, with the same motor a stronger pressing force can be applied. Alternatively, with a lower-powered motor the same pressing force can be applied compared to configurations from the prior art. This provides a more energy-efficient press brake, or alternatively, a stronger press brake.

In a further embodiment according to the invention the pulley assembly comprises 2-12 pulleys, preferably 4-10 pulleys, and most preferably 8 pulleys.

The more pulleys are provided between the motor and the lever, the more times the force provided by the motor is multiplied, resulting in a larger force on the lever compared to the force provided by the motor. By providing the abovementioned number of pulleys, an advantageous trade-off between a relatively low force needed to be provided by the motor and a stable press brake has been achieved.

In an embodiment according to the invention the pulley assembly comprises a plurality of frame pulleys that is fixed to the frame and a plurality of lever pulleys that is operatively connected to the lever, wherein a connecting element is alternately placed around a frame pulley and a lever pulley, and wherein the elongated flexible element is connected to the motor at a first end of the connecting element and fixed to the frame at a second end of the connecting element.

An advantage of the connecting element being alternatively placed around a frame pulley and a lever pulley is that it provides an easy way to operatively connect the motor to the lever via the pulley assembly.

Another advantage is that it provides a compact design of the press brake, thereby providing the ability to have a smaller press brake. This can be advantageous for example during transport of the press break. Furthermore this can be advantageous for placement of the press brake in for example factories.

In an embodiment according to the invention the press brake further comprises a pulley carrier element that is operatively connected to the plurality of lever pulleys and the lever, wherein the plurality of lever pulleys are positioned on the pulley carrier element.

The plurality of pulleys is preferably fixedly connected to the pulley carrier element. The pulley carrier element can for example have a triangular shape, wherein the plurality of pulleys is positioned on one side, and wherein the opposite corner of that side is operatively attached to the lever. It may be apparent to the skilled person that a T-shaped pulley carrier element is also possible.

An advantage of a pulley carrier element the plurality of lever pulleys can be easily attached to the lever.

Another advantage of using a pulley carrier element is that the force on the plurality of lever pulleys can be effectively concentrated and transmitted to the lever.

In an embodiment according to the invention, the motor comprises a high-speed motor operatively connected to a shaft, wherein the shaft is operatively connected to the lever for moving the lever, wherein the motor further comprises a low-speed motor that is operatively connected to the shaft via a one-way bearing.

With the use of the high-speed motor and the low-speed motor the movement of the lever from its release position to its press position, and thus the movement of the pressing part, is divided into two separate stages, namely a high-speed stage and a low-speed stage. The high-speed stage is driven by the high-speed motor and the low-speed stage is driven by the low-speed motor. In the context of the present application the low-speed motor is also known as the power motor.

In the embodiments where a plurality of pulleys are provided between the motor and the lever, the shaft is connected to a pulley whereon the connecting element is fixedly connected.

An advantage of the two stages is that the movement of the pressing part towards the plate to be pressed can be high at first instance, while being low speed with a high force at the moment the pressing part presses the plate to be pressed. An advantage of the combination of a high-speed motor with a low-speed motor is that the energy consumption of the motor as a whole is lower, as both motors are optimally adjusted to their function.

An advantage of the one-way bearing is that when the low-speed motor takes over from the high-speed motor, this will occur in a smooth, uninterrupted movement. Smooth in this case means that there is flawless transition from the high-speed stage to the low-speed stage. This increases the handling of the press brake and furthermore reduces the chance of erroneous pressing.

In an embodiment according to the invention a disconnectable coupling is provided for coupling the low-speed motor to the shaft.

Due to the disconnectable coupling, which may take the form of a gear, gear assembly, gearbox or other coupling, the low-speed motor can be uncoupled and/or disengaged from the shaft. In this way the high-speed motor can be used for moving the lever from its pressing position to its release position without interference from the low speed motor. The advantage hereof is that the time between two pressing cycles is greatly reduced.

In essence, this means that the high speed motor is used for transferring the lever over the larger part of its movement from the press position to the release position and vice versa. The low speed motor is especially configured for providing the force required for the pressing movement that brings the press in the press position.

In an embodiment according to the invention the disconnectable coupling is a magnetic coupling.

An advantage of the magnetic coupling is that it does not comprise mechanical coupling, thereby reducing the chance of wear. Another advantage is that magnetic coupling is configured to withstand large amounts of force without adverse effects on the construction.

In an embodiment according to the invention at least one side of the frame that is perpendicular to a longitudinal axis of the press brake has an access opening for accessing a plate to be pressed to and/or for replacing of tools of the press brake.

The side of the frame that is perpendicular to a longitudinal axis of the press brake is in the present invention the same as the longitudinal side of the frame. The access opening comprises an opening at or in at least one longitudinal side by or through which the plate to be pressed can be reached, for example when the plate to be pressed is positioned on the bottom pressing part. The access opening preferably has a size of substantially the distance the top pressing part moves when the lever goes from its release position to the press position.

An advantage of the access opening is that the plate to be pressed can be accessed from the side. This is for example advantageous when the plate to be pressed is to be pressed in a box-shape. When the plate to be pressed is substantially in a box-shape, it can be slid sideways out of the press brake via the access opening. This provides an easier handling of the press brake. Furthermore, the handling of the press brake is quicker. Another advantage of the access openings is that handling of the press brake is safer, as the operators does not have to take away the pressed plate from under the top pressing part, but take the pressed plate away with a sideways movement while accessing it from the access opening. Alternatively or additionally, through the access opening tools can be provided to the press brake.

Moreover, in the known press brakes with pulleys, the sides are often (completely) closed, which makes removing plate material and accessing the inner side of the press brake difficult if not impossible.

In a presently preferred embodiment, the access opening provides that the sides of press brake are substantially c-shaped. Thereby the access opening is easily accessible, while at the same time the rest of the press brake side is protected by a cover.

Another advantage is that the access opening provides the possibility to more easily access the inner side of the press brake, for example for the replacement of tools when some parts of the press brake have been worn out.

In an embodiment according to the invention the press brake comprises two levers that are positioned substantially at opposite longitudinal sides of the frame.

Preferably the levers are positioned in the plane parallel to the longitudinal sides. Both levers are operatively connected to the top pressing part of the pressing element. By placing two levers each at opposite longitudinal sides, the press brake provides an evenly distributed force over the top pressing part, thereby (further) improving the functioning of the press brake.

In an embodiment according to the invention, the press brake further comprises one or more levers that, when viewed along the longitudinal axis, are positioned substantially in between the longitudinal sides of the frame.

Preferably the lever is positioned in the plane parallel to the longitudinal sides. The advantage of one or more levers that, when viewed along the longitudinal axis, are positioned substantially in between the longitudinal sides of the frame is that extra pressing power is provided in the middle of the top pressing part. Preferably there is at least one lever positioned in the middle between the longitudinal sides of the frame. In the case of more levers positioned in between the sides, they are preferably spaced evenly apart. This is especially advantageous in combination with the two levers positioned at opposite longitudinal sides.

Another advantage is, especially with larger press brakes, that an even distribution of the force is achieved over the length of the plate material.

It is noted that multiple levers may be positioned along the length of the press brake, with the levers all being positioned substantially parallel to each other.

In an embodiment according to the invention the lever comprises an angle and/or an angled profile.

Preferably the angle in the lever is provided near the point where the lever is pivotably connected to the frame or near the pivot connection. An advantage of an angle in the lever is that the lever needs less space to fulfill its purpose, thereby providing the ability to have a more compact press brake.

Another advantage is that the movement of the top pressing part may be more easily controlled in both direction and amount of force that is exerted by the top pressing element on the plate material.

In an embodiment according to the invention the angle is in the range of 700-135°, preferably in the range of 800-100°, and most preferably is about 90°.

By providing the abovementioned angles for the lever, the lever occupies the least amount of space, thereby providing the most compact press brake. Alternatively or additionally, the abovementioned angles provide a stronger lever, thereby improving the durability of the press brake.

In an embodiment according to the invention the press brake further comprises a return element configured to return the lever system from the press position to the rest position.

Preferably the return element is connected to the frame and the lever, although an operative connection having multiple elements may be envisioned as well. The return element could for example be a tension spring or a compression spring, depending on the location at which the spring is connected to the frame and the lever. In another embodiment the return element could be another pulley system connected to the motor.

An advantage of the return element is that the lever will, after moving to the press position, automatically move back to its release position. This makes the operation of the press brake easier, reduces user actions and increases safety.

Alternatively, the return element could comprise an actuator. This has the advantage that the energy used for moving from the release position to the press position is, at least partly, used to move the lever back to its release position. This has as its advantage that the return element is subjected to a lower amount of force.

In an embodiment according to the invention, the return element is a spring element.

An advantage of the spring element is that it provides an efficient and cost-effective return element that can be easily replaced when worn.

Another advantage is that a spring element provides a bias to the top press element, which ascertains that the lever and therewith the pressing elements return to the release position if the motor is switched off and/or disconnected, for example due to a power outage. This improves safety of the press brake according to the invention.

In an embodiment according to the invention the press brake further comprises a load that at or near a first end thereof is pivotably connected to the frame and that at or near a second end thereof is operatively connected to the lever, wherein the weight of the load at least partially counteracts the weight of the top pressing part, and wherein the load in the press position acts on the spring element.

The load is preferably connected via a load connecting element, for example a band or a string, to the lever. Preferably the load connecting element is guided by pulleys such that when the lever is moved from the release position to the press position the direction of the force on the load is opposite to the force of gravity acting on the pressing part.

An advantage of having a load is that less force is needed to bring back the lever from the press position to the release position, as the load at least partially counteracts the weight of the top pressing part. Additionally or alternatively, the lever is able to move faster from the press position to the release position. This provides a faster operation of the press brake.

Another advantage is that, by providing that the load acts in the press position on the spring element, an effective design of the press brake is achieved. Furthermore, by using a load, the press brake can obtain a compact design, as the spring element can be made smaller, that is with a lighter, less strong spring, because a smaller force is needed to bring the press brake from the press position to the release position.

In an embodiment according to the invention, the return element comprises a first end and a second end, wherein the first end is hingeably connected to the frame and a second end is connected to two support hinge elements, wherein a first support hinge element is hingably connected to the lever and a second support hinge element is connected to the frame.

Due to the first support hinge element the return element is acted upon when the lever moves from its release position to its pressing position. This achieves that the resulting force on the connecting element is substantially the same in every position of the lever.

In an embodiment according to the invention, the return element and the two support hinge elements are positioned in a Y-configuration, wherein the return element is rotatably connected to each of the support hinge elements.

In the Y-configuration the support hinge elements are preferably the arms of the Y-configuration. In a preferred embodiment the return element is provided above the support hinge elements, thereby achieving an "upside-down" Y-configuration.

In an embodiment according to the invention, the press brake further comprises a front motor attached to the frame, and a second pulley assembly that is operatively connected to the front motor and wherein the second pulley assembly comprises a plurality of front frame pulleys attached to the frame, a plurality of pressing pulleys that are provided substantially inside the top pressing part, wherein the pressing pulleys, at least in the release position, are positioned substantially above the front frame pulleys, and a front connecting element alternately placed around a front frame pulley and a pressing pulley, and wherein the front connecting element is connected to the front motor at a first end and fixed to the frame at a second end of the front connecting element.

By providing a front motor attached on the frame and a second pulley assembly operatively connected therewith, a stronger force can be applied to the top pressing part, which stronger force is subsequently transferred to the plate to be pressed, such that it is possible to bend stronger and/or thicker plates. This configuration is only possible due to the fact that the pressing pulleys are provided at least partially inside the top pressing part. This particular feature allows the force exerted by the motor to be applied evenly and substantially directly to the top pressing part, therewith obviating a skewed distribution of the pressing force over the length of the pressing part.

An alternative or additional advantage is that a more compact design of the press brake is obtained. Providing the pressing pulleys substantially inside the top pressing part is for example possible by attaching the pressing pulleys in holes or openings provided in the top pressing part.

In an embodiment according to the invention, the plurality of pressing pulleys and front frame pulleys are provided at an angle $\alpha$ to a plane perpendicular to a longitudinal axis of the press brake.

By providing the pressing and front frame pulleys at an angle an even more compact design can be achieved. It is noted that the mentioned angle is in fact an angle with both the mentioned plane as well as the longitudinal axis, such that the angle with the longitudinal axis is $90°-\alpha$.

Preferably, the plurality of front frame pulleys are also positioned in holes provided in the top pressing part. These holes substantially have a vertical length of the path length which the top pressing part makes when going from the release position to the press position.

It is noted that, rather than providing a press brake with a lever according to the invention, at least one object of the invention may also be solved by providing a front press brake having a particular configuration. To that end, the present invention alternatively further also relates to a front press brake, comprising:

- a front press brake frame; a pressing element comprising a top pressing part and a bottom pressing part,
- wherein the bottom pressing part is operatively connected to the frame, and wherein the top pressing part and the bottom pressing part are configured to mate when the lever is in the press position;
- a front motor that is configured to move the press brake between the press position and the release position, wherein the front motor is operatively connected to the top pressing part; and
- a pulley assembly that is operatively connected to the front motor, wherein the pulley assembly comprises:
- a plurality of front frame pulleys attached to the frame;
- a plurality of pressing pulleys that are provided at least partially inside the top pressing part, wherein, in the release position, the pressing pulleys are positioned substantially above the front frame pulleys; and
- a front connecting element alternately placed around a front frame pulley and a pressing pulley, and wherein the front connecting element is connected to the front motor at a first end of the front connecting element and fixed to the frame at a second end of the front connecting element.

An advantage of the front press brake according to the invention is that, due to the position of the plurality of pressing pulleys (at least partially) inside the top pressing part, the clamping force provided by means of the motor is distributed more evenly along the top pressing part and, consequently, the plate to be bend or pressed. Therewith, a more even and precise angle can be provided to the plate to be pressed or bend.

In addition, a more compact configuration of a press brake is achieved, due to the fact that most of the components, such as the motor and the pulley assembly, are positioned inside the frame.

A further advantage of the front press brake is that it is applicable to multiple press brakes, as it is not limited to use in press brake with a lever. This means that the front press brake as disclosed above, may be used in combination with a hydraulic motor or spindle configuration.

The present invention further relates to a method for operating a press brake, the method comprising:

- providing a press brake according to one of the aforementioned embodiments;
- moving the lever from the release position to the press position; and
- pressing a plate with the pressing element.

The method provides the same effects and advantages as for the press brake according to the invention.

In an embodiment according to the invention the method further comprises returning the lever to the release position, preferably using the returning element.

BRIEF DESCRIPTION OF THE DRAWINGS

Further advantages, features and details of the invention are elucidated on the basis of preferred embodiments thereof, wherein reference is made to the accompanying drawings, in which.

DESCRIPTION OF THE INVENTION

Figure 1:
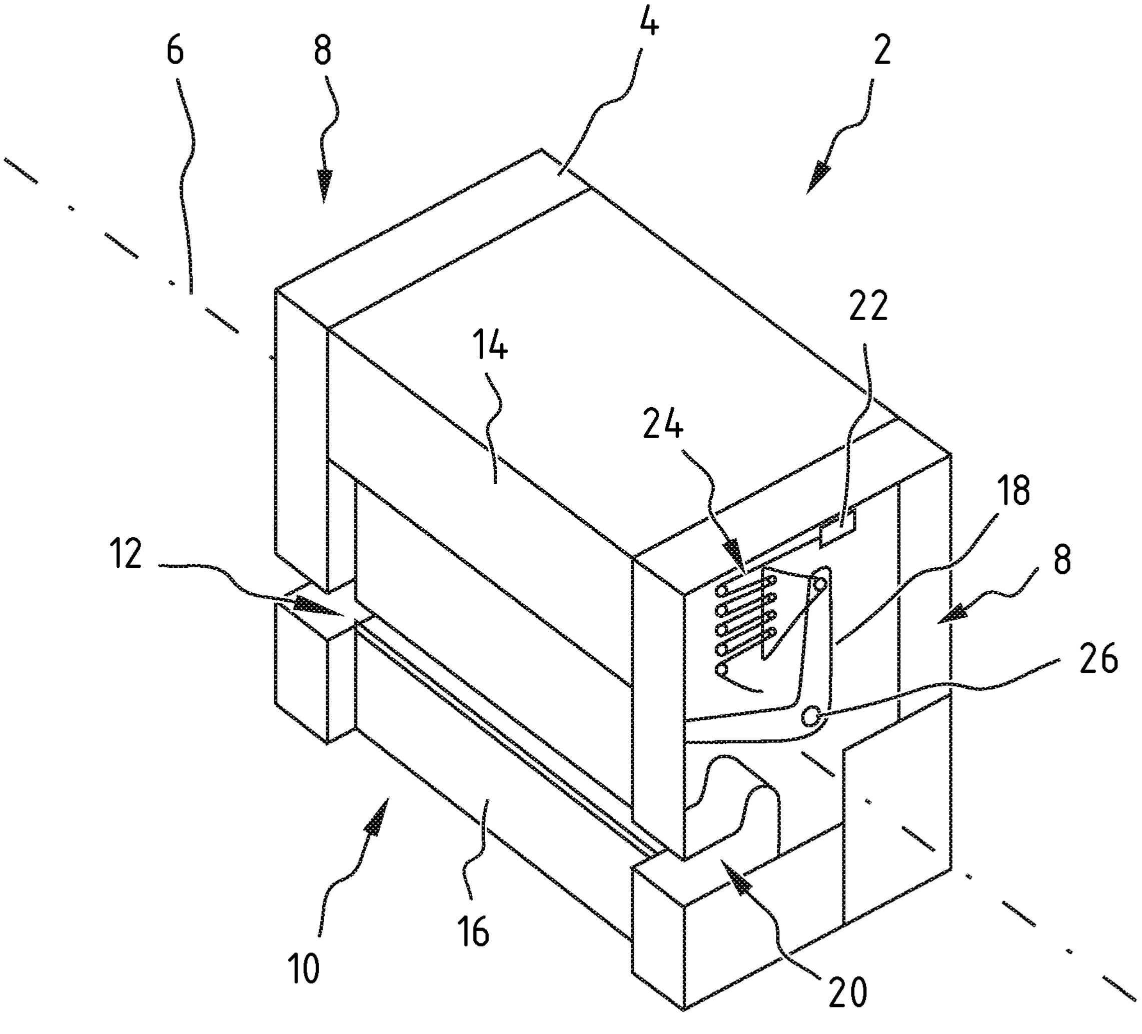
FIG. 1 shows an example of a press brake according to the invention.

Press brake 2 (FIG. 1) comprises press brake frame 4. Press brake frame 4 has a longitudinal axis 6, which stretches out between longitudinal sides 8. Longitudinal sides 8 are substantially perpendicular to longitudinal axis 6. Press brake frame 4 further has front 10 where pressing element 12 is positioned. Pressing element 12 comprises top pressing part 14 and bottom pressing part 16. Top pressing part 14 and bottom pressing part 16 are both plate shaped in the illustrated embodiment and are positioned in the same or similar direction as longitudinal axis 6 of press brake frame 4. Bottom pressing part 16 is fixed to the frame and top pressing part 14 is operatively connected to lever 18. Lever 18 is positioned such that the plane in which it transfers forces is substantially parallel to the plane of longitudinal sides 8. Lever 18 is pivotably connected to press brake frame 4 via pivot connection 26, in this example embodied as a hinge. Near pivot connection 26 lever 18 has a substantially perpendicular angle, such that a compact press brake 2 is obtained. Longitudinal axis 6 stretches out along the contact line between top pressing part 14 and bottom pressing part 16 when lever 18 is in press position 46.

Height L of press brake 2 in this example is 2.5 meters. Longitudinal sides 8 further comprise access openings 20, such that a plate to be bent can be slid out of press brake 2 in a sideways direction. Further attached to press brake frame 4 near longitudinal side 8 is electric motor 22. Electric motor 22 is operatively connected to lever 18 via pulley assembly 24. Pulley assembly 24 is also positioned such that it transfers forces in a substantially parallel plane of longitudinal sides 8. Alternatively, electric motor 22 is positioned in a plane substantially perpendicular to the plane of longitudinal sides 8.

Figure 2A:
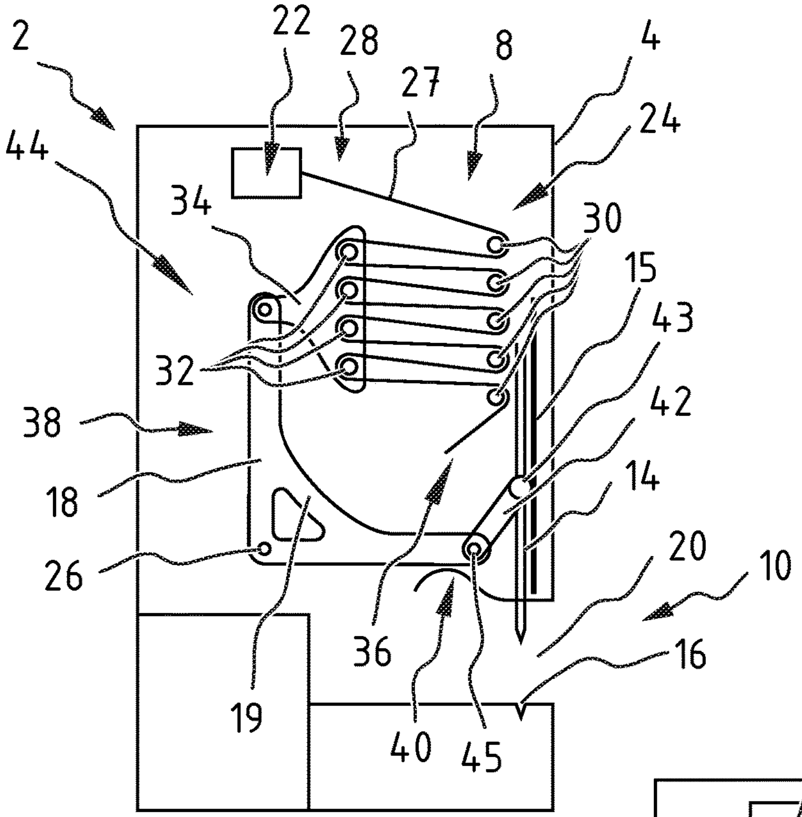
FIGS. 2A-B show a side view of an example of a press brake according to the invention.

Attached to press brake frame 4 (FIG. 2A) on longitudinal side 8 is electric motor 22 and pulley assembly 24. Pulley assembly 24 comprises in this example frame pulleys 30 attached to press brake frame 4, lever pulleys 32 attached to pulley carrier element 34 and connecting element 27, in this example a belt. Frame pulleys 30 and lever pulleys 32 are both placed in a line. Pulley carrier element 34 is operatively connected to first end 38 of lever 18. Lever 18 in this example further comprises support bar 19 to provide extra stability to lever 18. Connecting element 27 has been connected to electric motor 22 at motor end 28 of connecting element 27. At frame end 36 connecting element 27 has been attached to press brake frame 4. Connecting element 27 is alternately placed around frame pulleys 30 and lever pulleys 32, thereby providing an operative connection between electric motor 22 and lever 18 via pulley assembly 24 and pulley carrier element 34. At second end 40 lever 18 is connected via press connection 42 to top pressing part 14. Press connection 42 is operatively connected to second end 40 of lever 18 with first hinge connection 45 and operatively connected to top pressing part 14 with second hinge connection 43. Further shown is bottom pressing part 16. Lever 18 is in release position 44.

In release position 44 (FIG. 2A) lever pulleys 32 are positioned substantially away from frame pulleys 30. In release position 44 top pressing part 14 is therefore positioned at distance D from bottom pressing part 16. This provides the ability to position for example a steel plate on bottom pressing part 16.

Figure 2B:
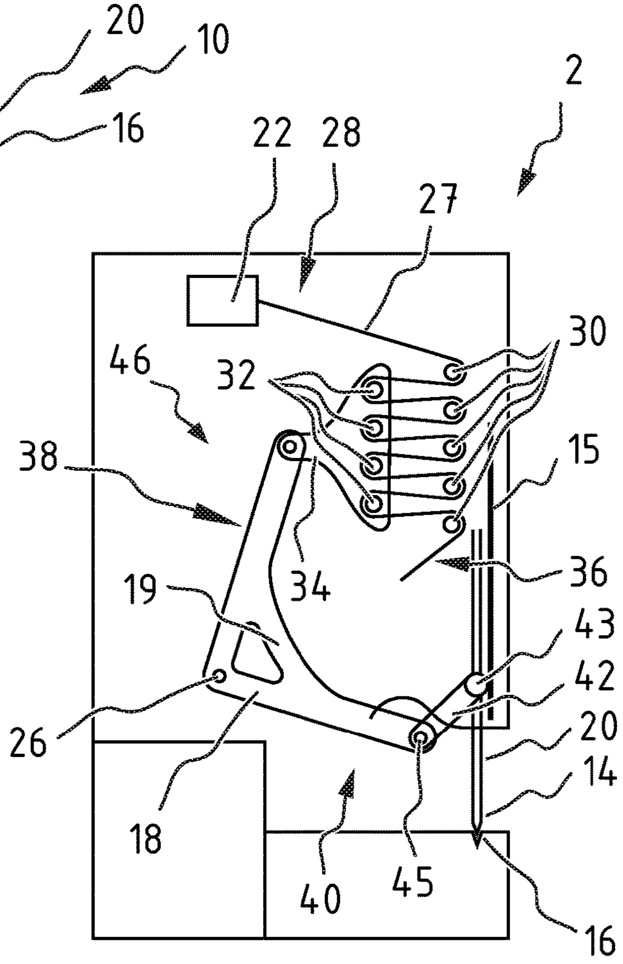

Lever 18 is positioned in press position 46 (FIG. 2B). In press position 46 of lever 18 top pressing part 14 is substantially pressed against bottom pressing part 16. In press position 46 electric motor 22 has pulled in connecting element 27 such that lever pulleys 32 have been brought towards frame pulleys 30. By pulling lever pulleys 32 towards frame pulleys 30 first end 38 of lever 18 is pulled towards frame pulleys 30, as first end 38 is operatively connected to lever pulleys 32 via pulley carrier element 34. Through pivot connection 26 and press connection 42 the movement of first end 38 of lever 18 is transferred to a substantially linear downwards movement of top pressing part 14. When for example a steel plate is placed on bottom pressing part 16, the top pressing part 14 will bend the steel plate such that it obtains a desired angle. Further provided in press brake frame 4 is guide 15 for guiding top pressing part 14 in a substantial linear downwards movement to bottom pressing part 16.

Figure 3:
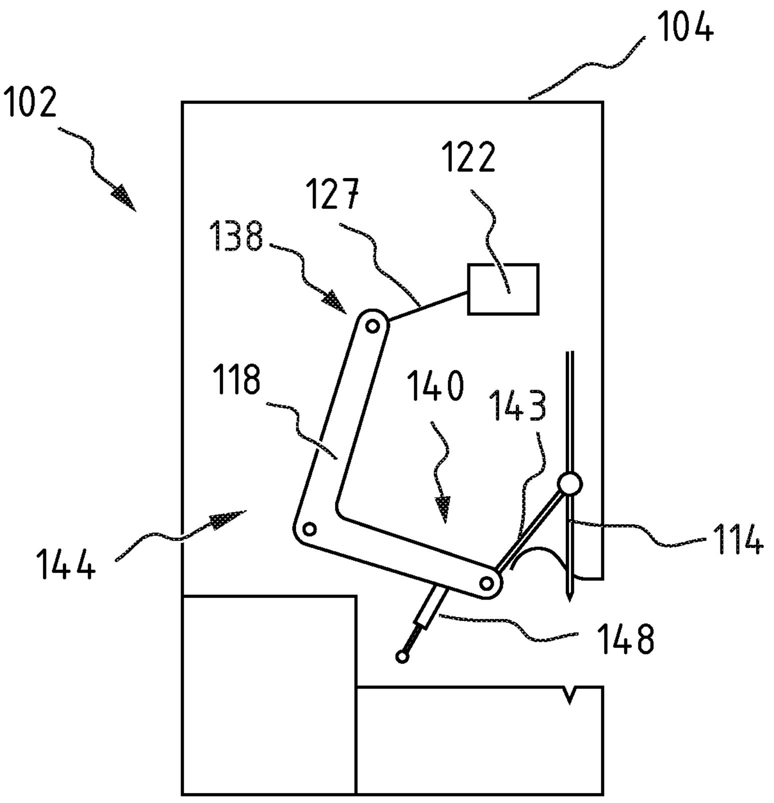
FIG. 3 shows a side of an alternative example of a press brake according to the invention.

Press brake 102 (FIG. 3) comprises electric motor 122 attached to press brake frame 104 and operatively connected via connecting element 127 to lever 118 at first end 138 of lever 118. Lever 118 is pivotably connected to press brake frame 104 and at second end 140 of lever 118 operatively connected with top pressing part 114 via press connection 142. Press brake 102 further comprises return element 148, in this example an actuator, that is connected to second end 140 of lever 118. By providing return element 148 lever 118 will automatically return to release position 144 when it is has been brought in press position 46. Return element 148 could also be embodied as a spring element.

Figure 4:
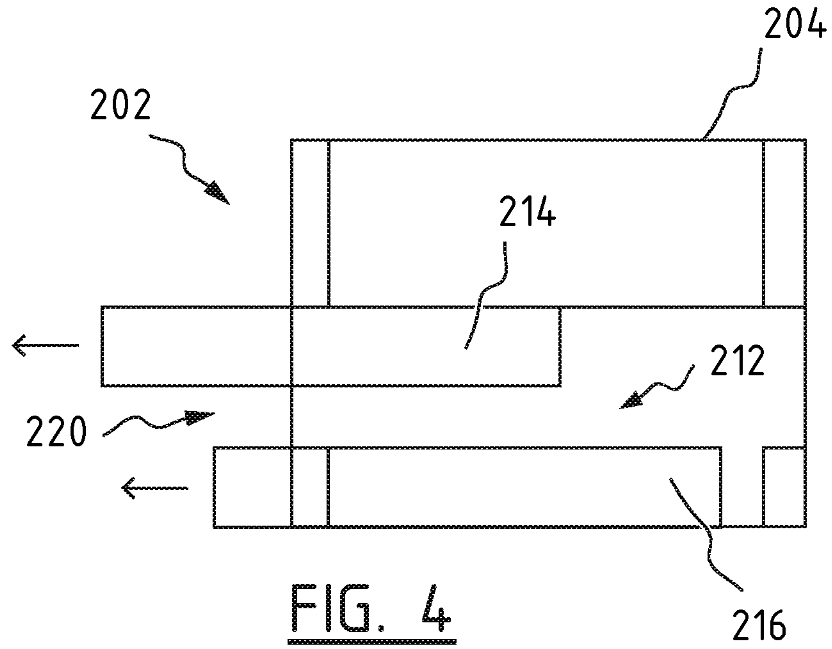
FIG. 4 shows an example of removing the pressing element from a press brake according to the invention.

Press brake 202 (FIG. 4) comprises press brake frame 204 and pressing element 212. Pressing element 212 comprises top pressing part 214 and bottom pressing part 216. Top pressing part 214 and bottom pressing part 216 can be easily removed sideways through access opening 220. This provides the ability to easily replace one or more parts from pressing element 212.

Figure 5:
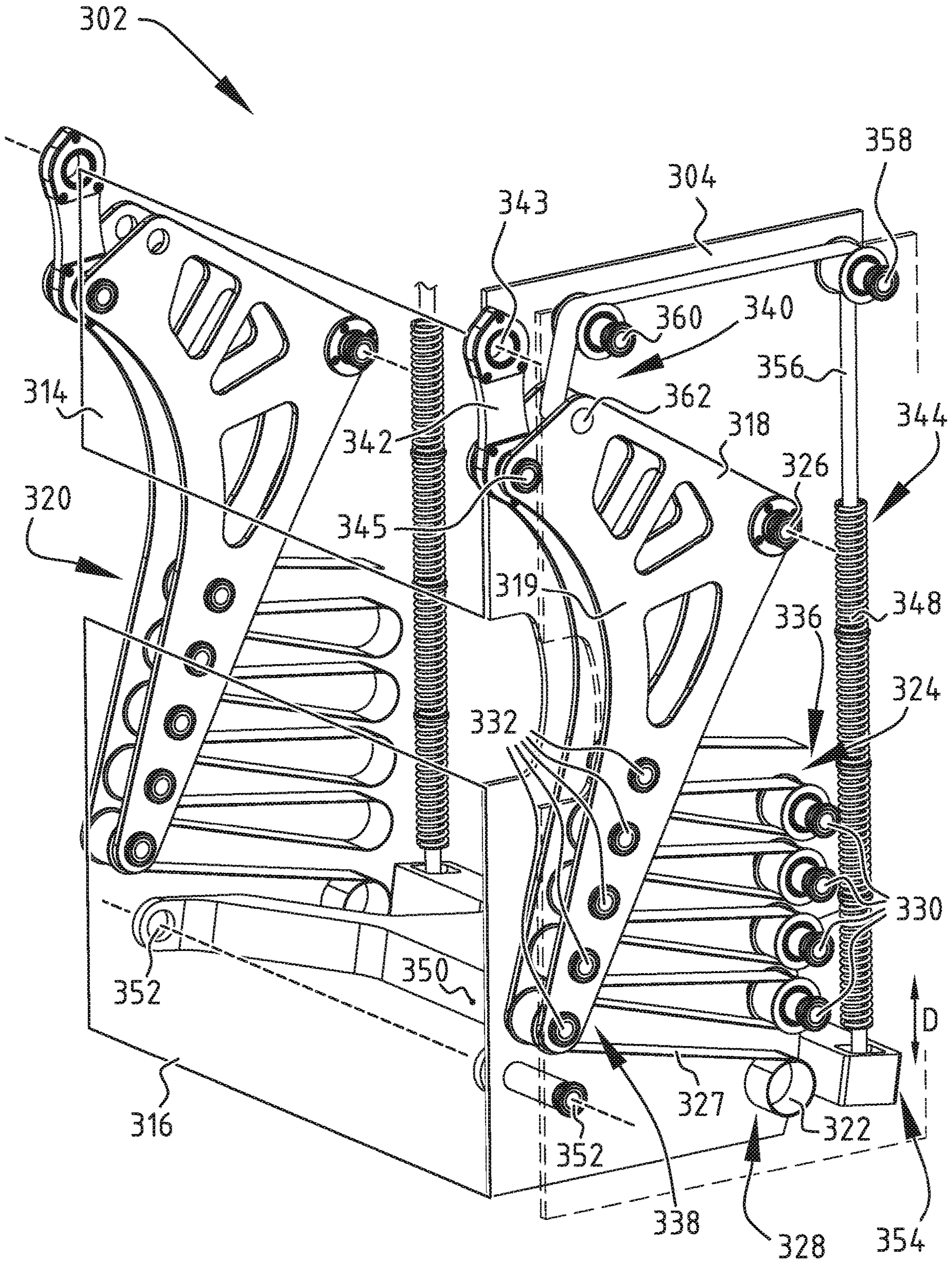
FIG. 5 shows an alternative example of a press brake according to the invention.

Press brake 302 (FIG. 5) also comprises press brake frame 304 and top pressing part 314 and bottom pressing part 316. In this alternative embodiment according to the invention motor 322 is placed substantially closer to the ground on press brake frame 304. Furthermore, frame pulleys 330 are attached to the frame and are connected via connecting element 327 to lever pulleys 332 which are attached to first end 338 of lever 318. Lever 318 pivots around pivot connection 326. Second end 340 of lever 318 is via first hinge connection 345 to press connection 342. Because press connection 342 is connected via second hinge connection 343 to top pressing part 314, by use of motor 322 first end 338 of lever 318 can be brought closer to frame pulleys 330, thereby moving top pressing part 314 down to bottom pressing element 316. Furthermore shown in FIG. 5A is load or weight 350 that is pivotely connected to press brake frame 304 by load pivot connection 352. At load end 354 load 350 is connected with load connecting element 356, via first load pulley 358 and second load pulley 360 to second end 340 of lever 318. This achieves that by a movement of lever 318 from release position 344 (shown here) to press position 46, load end 354 is moved upwards in direction D towards return element 348, which in this embodiment is spring 348. As such, load 350, which in this example is counterweight 350, forms a counterweight for the top pressing part. By moving load end 354 upwards, return element 348 is compressed, thereby providing the counterforce to move press brake 302 back from press position 346 to release position 344. The advantage of using load 350 is that it counters the weight of top pressing part 314, which achieves that the size of return element 348 can be reduced. Therefore, a more compact design of press brake 302 is obtained. Additionally or alternatively, press brake 302 is able to move faster from press position 346 to release position 344.

In an embodiment according to the invention lever 18 is in release position 44. Electric motor 22 pulls in connecting element 27 which is alternately placed around frame pulleys 30 and lever pulleys 32. Because connecting element 27 is connected to press brake frame 4 at frame end 36, the pulling in of connecting element 27 by electric motor 22 causes lever pulleys 32 to move towards frame pulleys 30, because frame pulleys 30 are fixed on press brake frame 4. The movement of the lever pulleys causes first end 38 of lever 18 to move towards frame pulleys 30, because first end 38 is operatively connected to lever pulleys 32 via pulley carrier element 34. This moves lever 18 from release position 44 to press position 46. Through pivot connection 26 lever 18 transfers the movement of first end 38 to second end 40 of lever 18. Second end 18 transfers the movement via press connection 46 to top pressing part 14, causing top pressing part 14 to make a substantially linear downwards movement towards bottom pressing part 16, hereby bending a plate to be bend and that is placed on bottom pressing part 16. When lever 18 is in press position 46, return element 148 provides a force on second end 40 of lever 18 such that lever 18 returns to its release position 44. The plate can be removed from press brake and a new plate can be provided in the opening between the pressing parts. Then a new pressing cycle of going from release position 44 to press position 46 could be started.

Figure 6A:
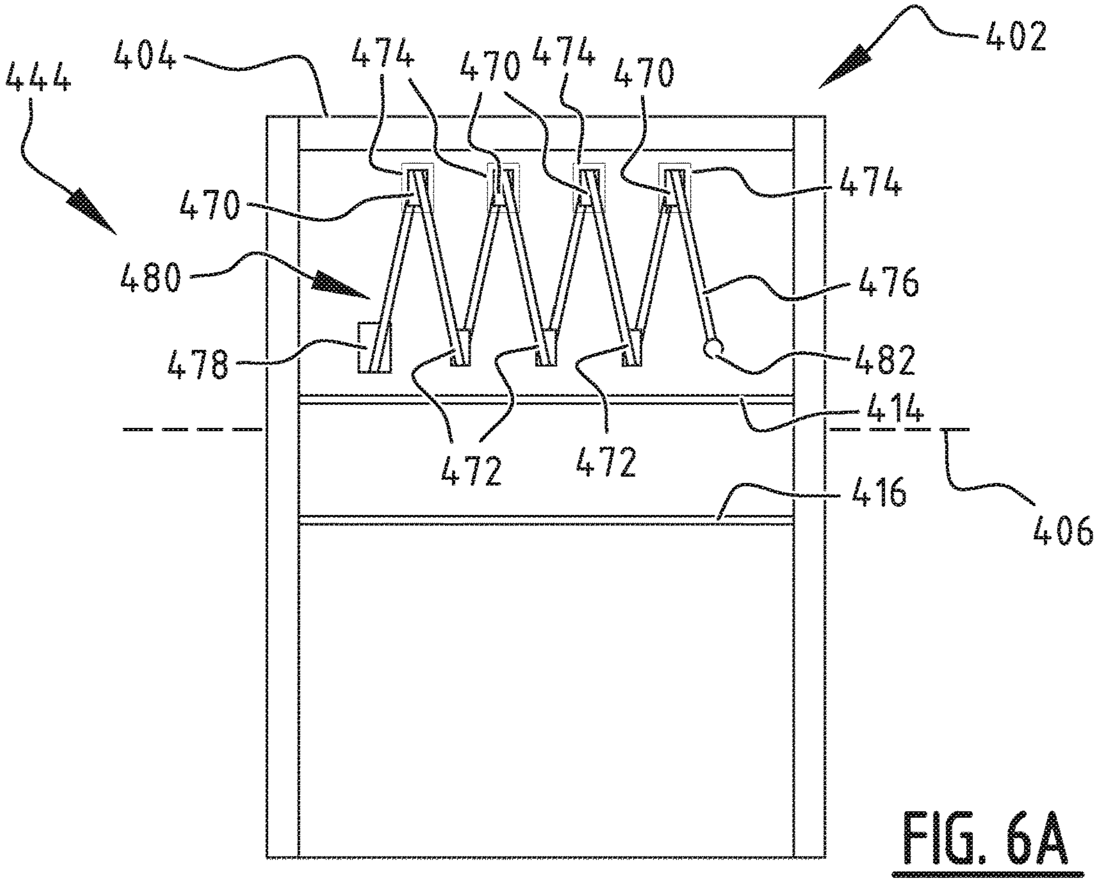
FIGS. 6A-B show a schematic front view of an alternative embodiment according to the invention.
Figure 6B:
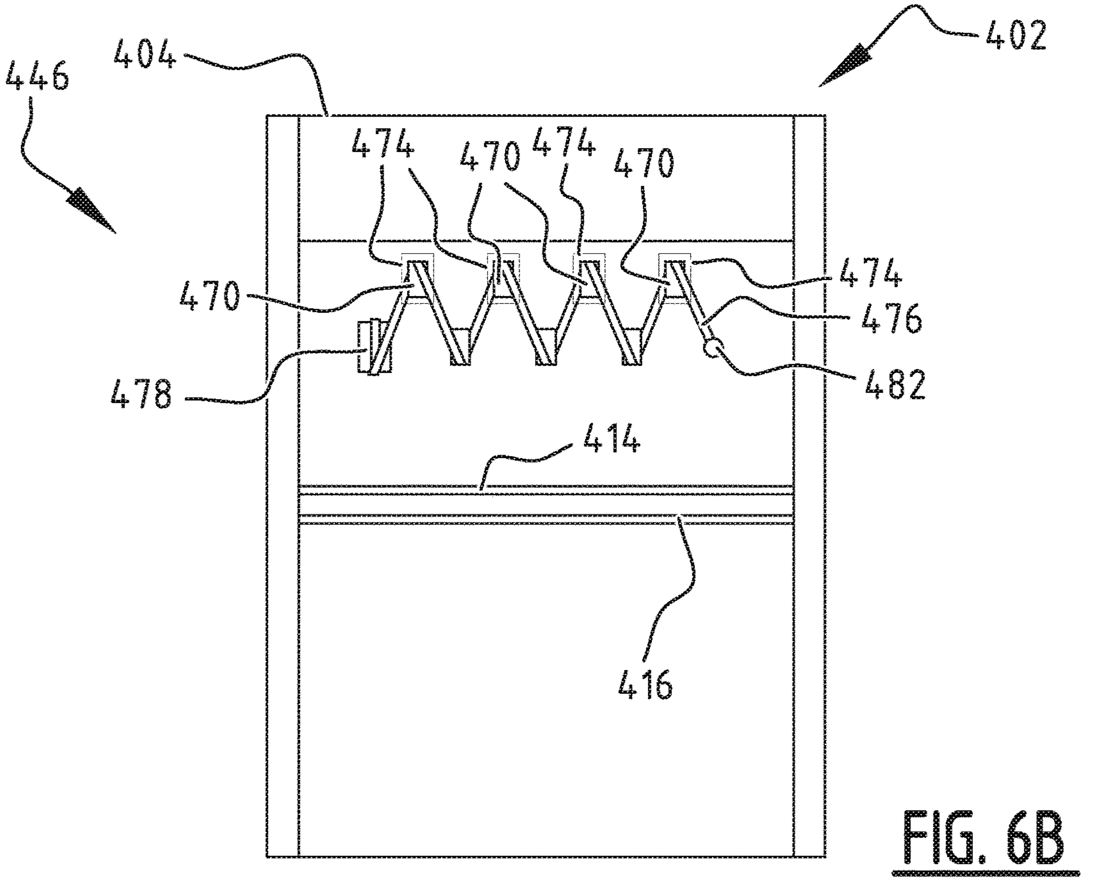

Front press brake 402 (FIG. 6A) comprises front press brake frame 404. On front press brake frame 404 front frame pulleys 472 are attached. In holes 474 provided in an upper part of top pressing part 414 pressing pulleys 470 are attached. In this embodiment pressing pulleys 470 and front frame pulleys 472 are perpendicular to the longitudinal axis 406 of front press brake 402. These pressing pulleys 470 are substantially provided inside top pressing part 414 and thus are at least partially positioned therein. Alternately placed around pressing pulleys 470 and front frame pulleys 472 is front connecting element 476, which can for example be a band, a chain, a belt or a string. A first end 480 front connecting element 476 is connected to front motor 478, wherein front motor 478 is attached to front press brake frame 404. At second end 482 front connecting element 476 is connected to frame 404. Front press brake 404 in FIG. 6A is shown in its release position 444. When front motor 478 is activated and shortens front connecting element 476, front press brake 402 is brought in its press position 446 (FIG. 6B). By shortening front connecting element 476 pressing pulleys 470 attached on top pressing part 414 is brought towards front frame pulleys 472, thereby bringing top pressing part 414 towards bottom pressing part 416.

Figure 7:
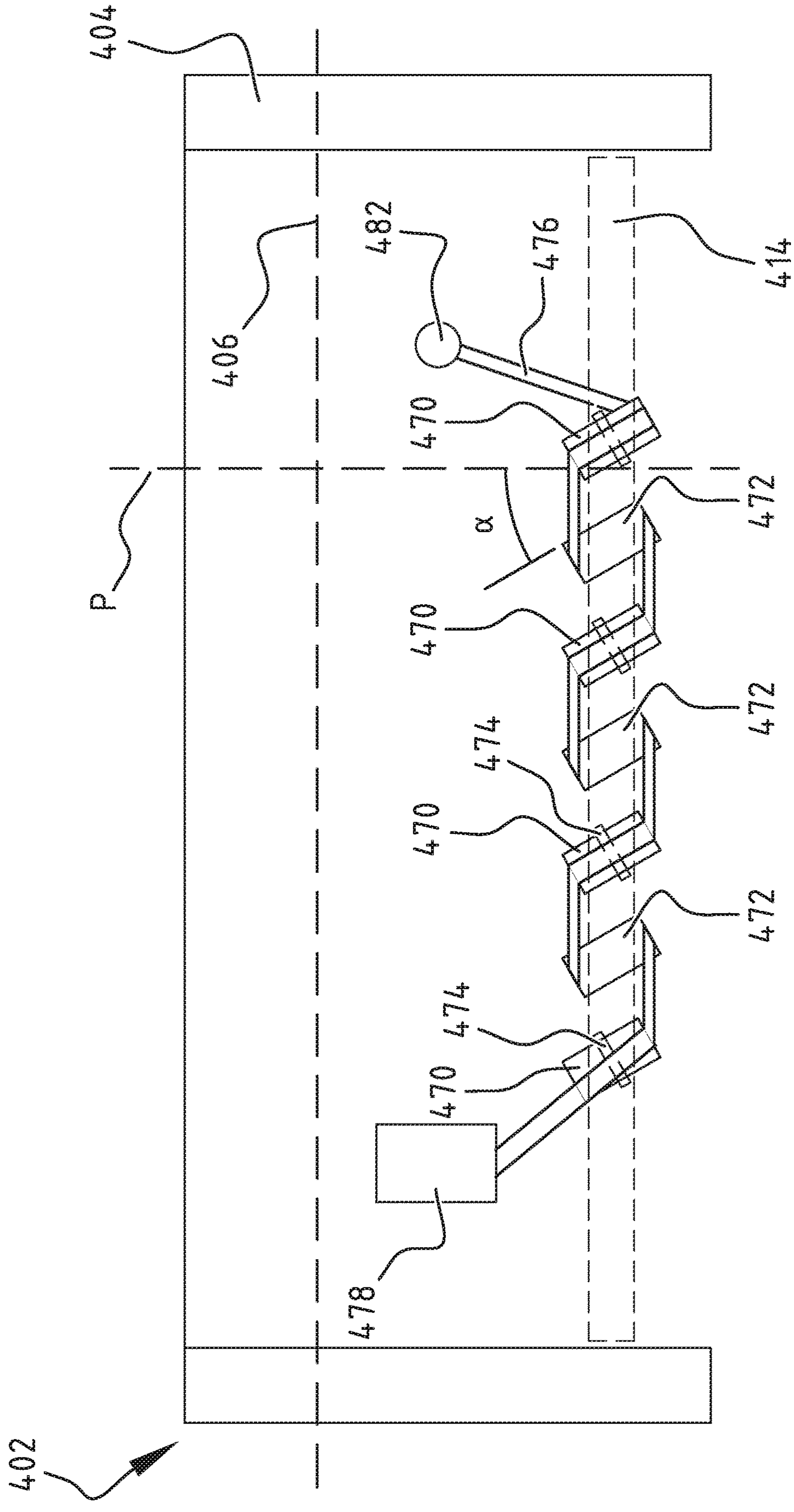
FIG. 7 shows a schematic top view of an alternative embodiment according to the invention.

FIG. 7 is a top schematic top view of front press brake 402. Herein shown is top pressing part 414, wherein holes 474 are provided such that pressing pulleys 470 can be attached substantially inside top pressing part 414. Between and below pressing pulleys 470 front frame pulleys 472 are attached on front press brake frame 404 and front connecting element 476 is alternately placed around a pressing pulley 470 and a front frame pulley 472. Pressing pulleys 470 and front frame pulleys 472 are provided at an angle $\alpha$ relative to plane P being perpendicular to longitudinal axis 406 of front press brake 402, such that a compact design of the pulley assembly is achieved. It is noted that front frame pulleys 472 are therewith also at an angle with longitudinal axis 406, which angle is related to angle $\alpha$ in that the angle with longitudinal axis 406 is $90°-\alpha$.

It is explicitly noted that a design shown in FIGS. 6A-B and FIG. 7 can be used as a stand alone drive of a press brake. Furthermore, this design can also be applied on a press brake according to the FIGS. 1-5. However, the application of the design of FIGS. 6A-B and FIG. 7 is not limited thereto, as it could also be used as an extra drive for any of the prior art press brakes. For example, it could be applied to a press brake making use of a hydraulic drive or with a spindle configuration.

Figure 8A:
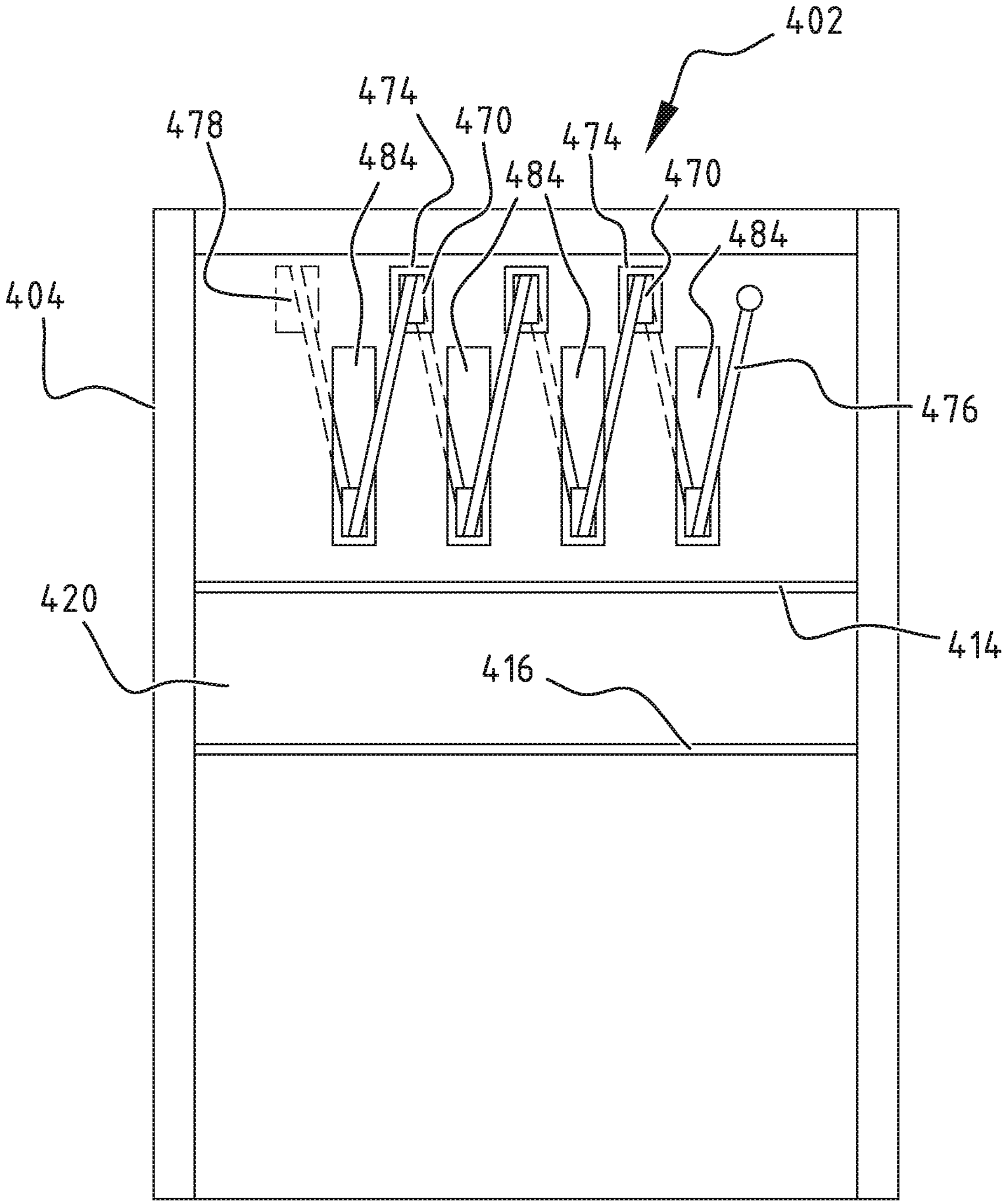
FIGS. 8A-B show respectively a schematic front and side view of an alternative embodiment according to the invention.
Figure 8B:
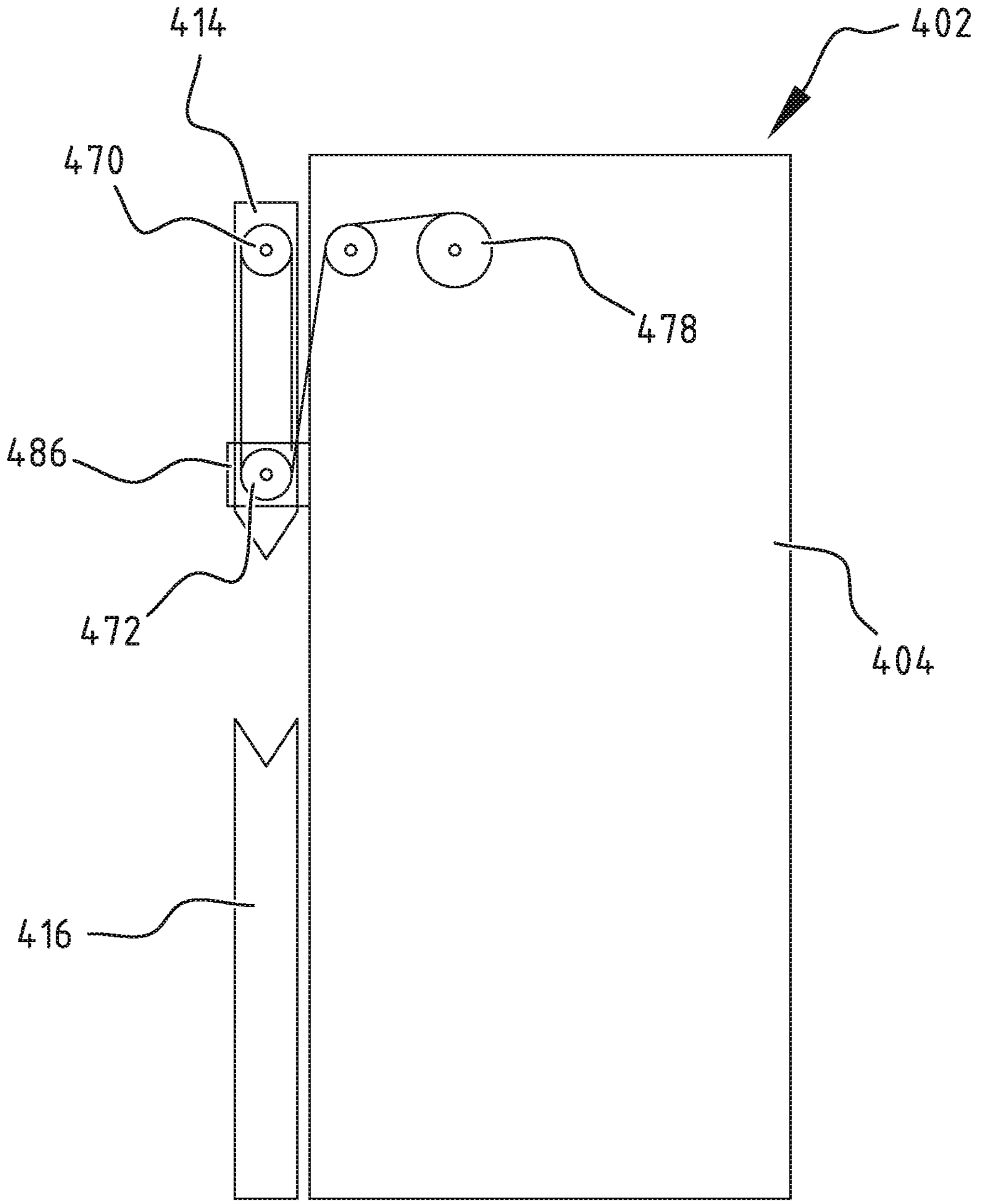

In FIGS. 8A-B an alternative front press brake 402 is shown. Herein are front frame pulleys 472 provided in holes 484, which have substantially a vertical size of the path length which top pressing part 414 makes when moving from the release position to the press position. Having front frame pulleys 472 provided in holes 484 assures that front frame pulleys 472 are positioned substantially in the same vertical plane as pressing pulleys 470. This has the advantage that an effective and compact front press brake 402 is obtained, as the force exerted on front connecting element 476 is substantially in the same direction as the direction of front connecting element 476. Attached to support frame 486 (FIG. 8B) are front frame pulleys 472, wherein support frame 486 is provided in holes 484.

Figure 9A:
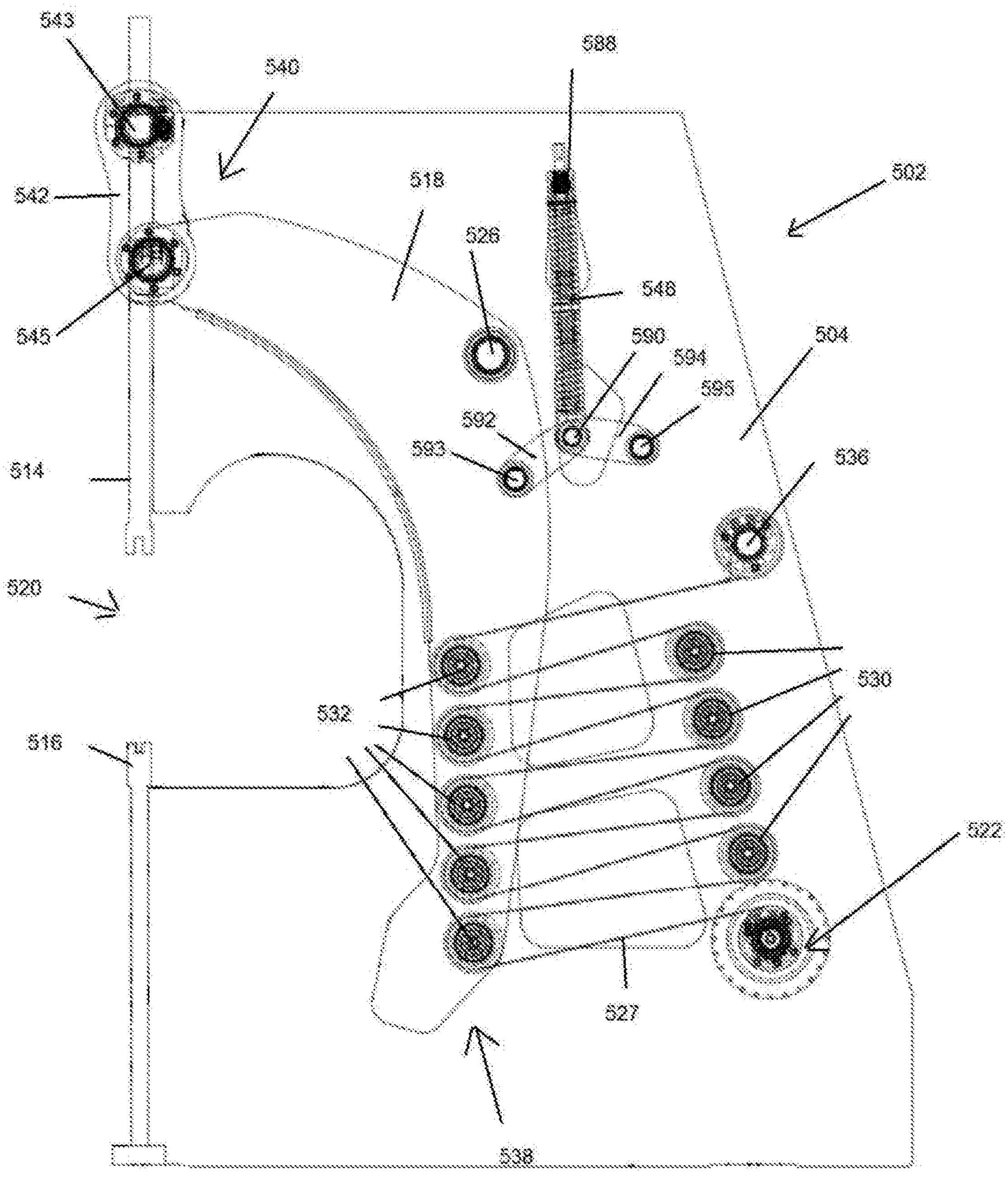
FIGS. 9A-B show an alternative example of a press brake according to the invention.
Figure 9B:
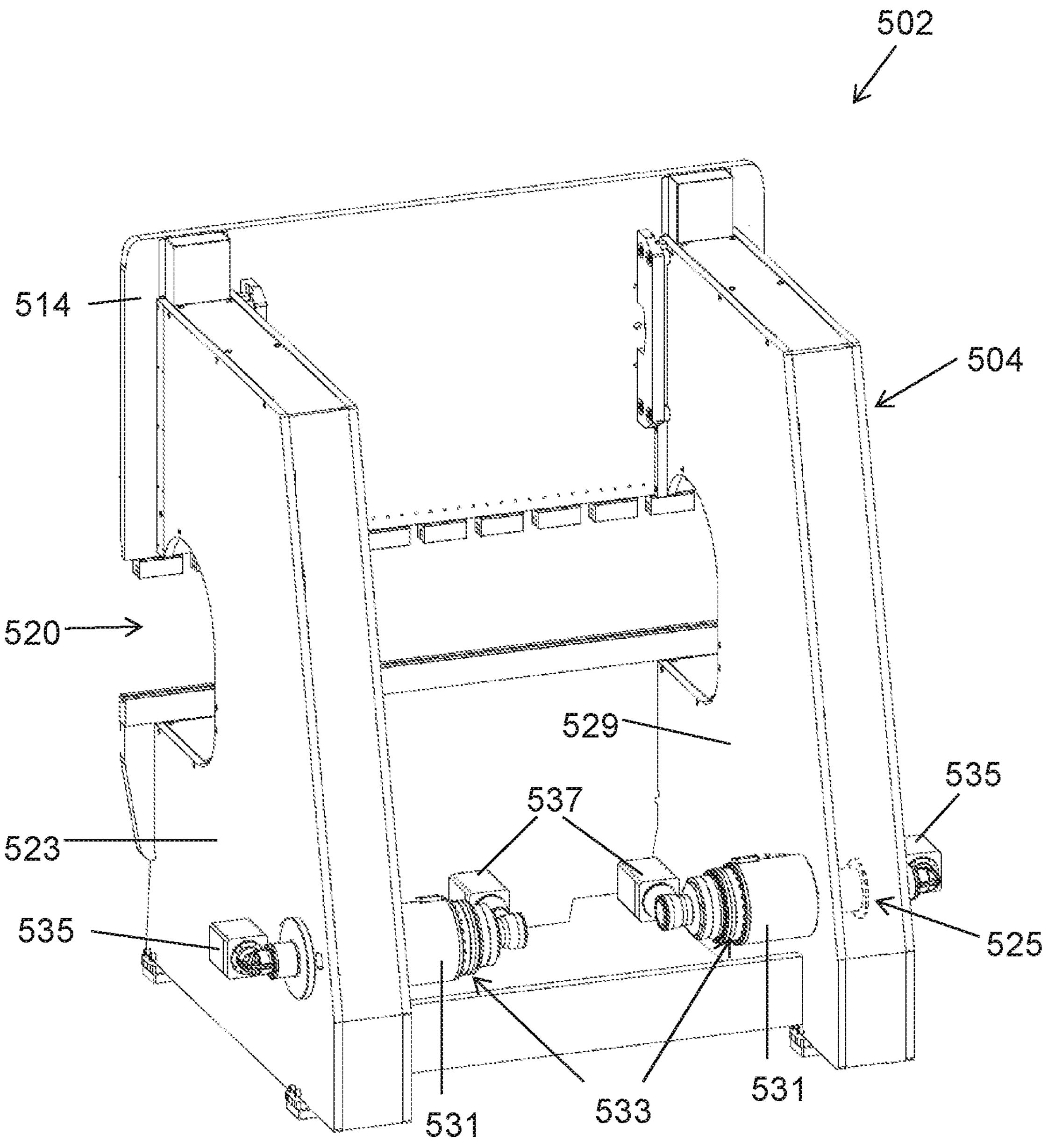

In FIGS. 9A-9B another example of press break 502 according to the invention is shown. Press brake 502 also comprises press brake frame 504 wherein top pressing part 514 and bottom pressing part 516 are provided. In the illustrated embodiment motor 522 is placed substantially closer to the ground on press brake frame 504 similar to the embodiment of FIG. 5. Furthermore, frame pulleys 530 are attached to the frame and are connected via connecting element 527 to lever pulleys 532 which are attached to first end 538 of lever 518. Lever 518 pivots around pivot connection 526. Second end 540 of lever 518 is via first hinge connection 545 connected to press connection 542. Because press connection 542 is connected via second hinge connection 543 to top pressing part 514, by use of motor 522 first end 538 of lever 518 can be brought closer to frame pulleys 530, thereby moving top pressing part 514 down to bottom pressing element 516.

Furthermore shown in FIG. 9A is return element 548, in this example embodied as a spring element. Return element 548 has a first end 588 that is hingeably connected to frame 504. Second end 590 of return element 548 is hingably connected to two support hinge elements 592 and 594. Support hinge element 592 is hingably connected to lever 518 through connection 593, while support hinge element 594 is hingably connected to press brake frame 504 through connection 595. Return element 548 and support hinge elements 592 and 594 are positioned in (an inverse) Y-shaped configuration, wherein support hinge elements 592 and 594 are the arms of the Y-shape. As second end 590 of return element 548 is positioned above connections 593 and 595, return element 548 will contract when lever 518 is brought from the release position to the press position. In the (unlikely) situation that connecting element 527 breaks, configuration lever 518 will automatically return to its release position, thereby further increasing the safety of press break 502. Preferably, return element 548 is positioned such that the force applied on connecting element 527 is substantially constant.

Motor 522 comprises high-speed motor 535 and low speed motor 537. High-speed motor 535 is in this example provided on the outer side 523 of press break frame 504. High-speed motor 535 is operatively connected to shaft 525 (schematically shown in FIG. 9*b*) on which connecting element 527 is attached (not shown). On the inner side 529 of press break frame 504 low-speed motor 537 is attached. High-speed motor 535 and low-speed motor 537 are connected with each other through a magnetic coupling 531 and one-way bearing 533 as well as shaft 525. When lever 518 is in its release position, high-speed motor 535 first realizes a fast downward movement of top pressing part 514. High-speed motor 535 and low-speed motor 537 are in this stage coupled through magnetic coupling 531. After high-speed motor 535 slows down, low-speed motor 537 takes over the drive of the downward movement of top pressing part 514. Due to the one-way bearing provided between shaft 525 and low-speed motor 537, the overtake from high-speed motor 535 to low-speed motor 537 is flawless, which means the transition occurs stop or sudden change in speed. Low-speed motor 537 then drives top pressing part 514 with enough force to bend metal sheets that are provided through opening 520. For moving top pressing part 514 upwards and thus moving lever 518 to its release position, magnetic coupling 531 is uncoupled such that high-speed motor 535 moves top pressing part 514 upwards with a high speed. Due to this configuration of the drive a fast and sufficiently powerful press brake is obtained.

The present invention is by no means limited to the above described preferred embodiments thereof. The rights sought are defined by the following claims within the scope of which many modifications can be envisaged.

The invention claimed is:

1. A press brake, comprising:
- a lever that is moveably attached to a frame and that is moveable between a press position and a release position;
- a motor that is operatively attached to the frame and the lever, wherein the motor is configured to move the lever between the press position and the release position;
- a pulley assembly operatively connected to and positioned between the motor and the lever, the pulley assembly comprising a plurality of frame pulleys fixed to the frame and a plurality of lever pulleys operatively connected to the lever;
- a connecting element alternately placed around a frame pulley and a lever pulley and
- a pressing element comprising a top pressing part and a bottom pressing part,
- wherein one of the bottom pressing part and the top pressing part is operatively connected to the frame, wherein the other of the top pressing part and the bottom pressing part is operatively connected to the lever, and wherein the top pressing part and the bottom pressing part are configured to mate when the lever is in the press position,
- wherein the connecting element is connected to the motor at a first end of the connecting element and fixed to the frame at a second end of the connecting element.

2. The press brake according to claim 1, wherein the lever is pivotably connected to the frame, and/or wherein the motor comprises an electric motor.

3. The press brake according to claim 2, wherein the pulley assembly comprises 2-20 pulleys.

4. The press brake according to claim 1, wherein the pulley assembly comprises 8-10 pulleys.

5. The press brake according to claim 1, wherein the press brake further comprises a pulley carrier element that is operatively connected to the plurality of lever pulleys and the lever, wherein the lever pulleys are positioned on the pulley carrier element.

6. The press brake according to claim 1, wherein the motor comprises a high-speed motor operatively connected to a shaft, wherein the shaft is operatively connected to the lever for moving the lever, wherein the motor further comprises a low-speed motor that is operatively connected to the shaft via a one-way bearing.

7. The press brake according to claim 6, wherein a disconnectable coupling is provided for coupling the low-speed motor to the shaft.

8. The press brake according to claim 7, wherein the disconnectable coupling is a magnetic coupling.

9. The press brake according to claim 1, wherein at least one side of the frame that is perpendicular to a longitudinal axis of the press brake has an access opening for accessing a plate to be pressed in and/or replacing of tools of the press brake.

10. The press brake according to claim 9, further comprising a second lever arranged such that, when viewed along the longitudinal axis, the lever and second lever are positioned in between the longitudinal sides of the frame.

11. The press brake according to claim 1, comprising a second lever positioned at an opposite longitudinal side of the frame from the lever.

12. The press brake according to claim 1, wherein the lever comprises an angle.

13. The press brake according to claim 1, further comprising a return element configured to return the lever from the press position to the rest position, wherein the return element preferably is a spring element, further preferably comprising a load that at or near a first end is pivotably connected to the frame and that at or near a second end thereof is operatively connected to the lever, wherein the weight of the load at least partially counteracts the weight of the top pressing part, and wherein the load in the press position acts on the spring element.

14. The press brake according to claim 13, wherein the return element comprises a first end and a second end, wherein the first end is hingeably connected to the frame and a second end is connected to two support hinge elements, wherein a first support hinge element is hingably connected to the lever and a second support hinge element is connected to the frame.

15. The press brake according to claim 13, wherein the return element and the two support hinge elements are positioned in a Y-configuration.

16. The press brake according to claim 1, wherein the motor is attached to the frame near a front side thereof, and further comprising:
- a second pulley assembly that is operatively connected to the motor and wherein the second pulley assembly comprises:
- a plurality of front frame pulleys attached to the frame;
- a plurality of pressing pulleys that are provided at least partially inside the top pressing part, wherein the pressing pulleys, at least in the release position, are positioned substantially above the front frame pulleys; and
- a front connecting element alternately placed around a front frame pulley and a pressing pulley, and wherein the front connecting element is connected to the motor at a first end of the front connecting element and fixed to the frame at a second end of the front connecting element.

17. The press brake according to claim 16, wherein the plurality of pressing pulleys and front frame pulleys are provided at an angle relative to a plane perpendicular to a longitudinal axis of the press brake.

18. A method for operating a press brake, comprising:

providing a press brake according to claim 1;

moving the lever from the release position to the press position; and pressing a plate with the pressing element.

19. The method of claim 18, further comprising returning the lever to the release position with a returning element.

* * * * *